United States Patent Office 3,810,936
Patented May 14, 1974

3,810,936
2-FORMYL 3-OXYGENATED 5-OXYCYCLOPEN-TANEHEPTANOIC ACIDS, ESTERS CORRESPONDING AND DERIVATIVES
Masateru Miyano, Morton Grove, Ill., assignor to G. D. Searle & Co., Chicago, Ill.
No Drawing. Continuation-in-part of abandoned application Ser. No. 799,965, Feb. 17, 1969. This application Oct. 8, 1971, Ser. No. 187,853
Int. Cl. C07c 61/36
U.S. Cl. 260—468 K        7 Claims

ABSTRACT OF THE DISCLOSURE

The condensation of dimethyl 3-oxoundecane-1,11-dioate with styrylglyoxal affords 14-phenyl-9,12-dioxo-11-hydroxytetradec-13-enoic acid, which is cyclized to afford 3-hydroxy-5-oxo-2-styrylcyclopent - 1 - eneheptanoic acid. Hydroxylation of the styryl double bond affords the corresponding 2-($\alpha,\beta$-dihydroxyphenethyl) derivative, which is cleaved to afford the instant 2-formyl compounds. The racemic 2-styryl-3-hydroxy compounds are resolved and subsequently hydroxylated and cleaved to form the optically active 2-formyl derivatives. The instant compounds are useful as anti-microbial agents and also as intermediates to prostanoic acid derivatives and their optically active isomers which exhibit anti-microbial, pepsin-inhibitory, hypotensive and smooth muscle-contracting properties.

---

This application is a continuation-in-part of my copending application Ser. No. 799,965 filed Feb. 17, 1969, and now abandoned.

The present invention is concerned with novel chemical compounds characterized by a 2-formyl cyclopentane structure and, more particularly, with 2-formyl 3-oxygenated 5-oxocyclopentaneheptanoic acids and esters corresponding represented by the following structural formula

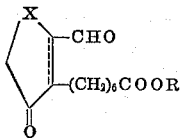

wherein the dashed line indicates the optional 1,2-double bond, R can be hydrogen or a lower alkyl radical and X is a carbonyl radical or a radical of the formula

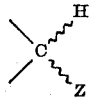

with Z being hydroxy, lower alkanoyloxy and chloro(lower alkanoyl)oxy and the wavy lines representing the $\alpha$ and $\beta$ configurations and the racemic mixtures corresponding.

The lower alkyl radicals represented by R are typified by methyl, ethyl, propyl, butyl, pentyl, hexyl, heptyl and the branched-chain groups isomeric therewith.

Illustrative of the lower alkanoyl radicals encompassed by the X term are formyl, acetyl, propionyl, butyryl, valeryl, caproyl, heptanoyl and the corresponding branched-chain isomers.

Starting materials suitable for the manufacture of the compounds of this invention are styrylglyoxal, conveniently prepared by the selenous acid oxidation of 4-phenyl-3-buten-2-one, and the dialkyl esters of 3-oxoundecane-1,11-dioic acid. Dimethyl 3-oxoundecane-1,11-dioate is thus saponified with potassium hydroxide and the resulting dicarboxylic acid is allowed to react with styryl- glyoxal, thus affording 14-phenyl-9,12-dioxo-11-hydroxytetradec-13-enoic acid. Cyclization of the latter intermediate in the presence of potassium hydroxide results in 3-hydroxy-5-oxo-2-styrylcyclopent-1-eneheptanoic acid.

The 2-($\alpha,\beta$-dihydroxyphenethyl) derivatives are readily obtained by hydroxylation of the corresponding 2-styryl compounds. A convenient reagent is osmium tetroxide. Methyl 3-acetoxy-5-oxo-2-styrylcyclopent-1-eneheptanoate is thus contacted at room temperature with osmium tetroxide in dioxane to produce methyl 3-acetoxy-5-oxo-2-($\alpha,\beta$-dihydroxyphenethyl)cyclopent-1-eneheptanoate.

The 2-formyl compounds of this invention are then conveniently prepared by cleaving the glycol structure of the corresponding 2-($\alpha,\beta$-dihydroxyphenethyl) substances. 3-acetoxy - 5 - oxo-2-($\alpha,\beta$-dihydroxyphenethyl)cyclopent-1-eneheptanoate in ethanol is contacted with aqueous sodium periodate, thus affording 3-acetoxy-2-formyl-5-oxocyclopent-1-eneheptanoate. The instant 2-formyl compounds are alternatively produced from the corresponding 2-styryl derivatives by combining the hydroxylation and cleavage processes. Methyl 3-hydroxy-5-oxo-2-styrylcyclopent-1-eneheptanoate in aqueous dioxane is thus allowed to react with osmium tetroxide and sodium periodate to afford methyl 2-formyl-3-hydroxy-5-oxocyclopent-1-eneheptanoate.

Oxidation of the instant 3-hydroxy compounds results in the corresponding 3,5-dioxo substances. Chromium trioxide in pyridine thus converts methyl 3-hydroxy-5-oxo-2-styrylcyclopent-1-eneheptanoate to methyl 3,5-dioxo-2-styrylcyclopent-1-eneheptanoate. The 2-formyl compounds are produced from the 2-styryl derivatives by hydroxylation and cleavage as described previously.

The optically active 2-formyl-3-oxygenated compounds of this invention are conveniently prepared from the racemic 2-styryl-3-hydroxy compounds by resolution of the latter compounds with either (+) or (−)-O-methylmandelyl chloride, thus forming the isomeric 2-styryl-3-((−)-O-methylmandeloxy) derivatives or the corresponding (+) derivatives, which can be separated chromatographically. Treatment of the latter compounds with base, such as potassium carbonate, affords the 2-styryl-3$\alpha$-hydroxy and 2-styryl-3$\beta$-hydroxy derivatives which can be hydroxylated and cleaved in the manner described previously to produce the optically active 2-formyl-3$\alpha$-hydroxy and 2-formyl -3$\beta$-hydroxy compounds, respectively. Typically, 3-hydroxy-5-oxo-2-styrylcyclopent-1-eneheptanoic acid is contacted with (−)-O-methylmandelyl chloride to produce 3$\beta$-((−)-O-methylmandeloxy)-5-oxo - 2 - styrylcyclopent-1-eneheptanoic acid and 3$\alpha$-((−)-O-methylmandeloxy)-5-oxo - 2 - styrylcyclopent-1-eneheptanoic acid, which are separated chromatographically on silicic acid. Treatment of the separated optical isomers with potassium carbonate affords (+)-3$\beta$-hydroxy-5-oxo - 2 - styrylcyclopent-1-eneheptanoic acid and (−) - 3$\alpha$ - hydroxy-5-oxo - 2 - styrylcyclopent-1-eneheptanoic acid, respectively. Subsequent hydroxylation with osmium tetroxide and cleavage with sodium periodate yields (+)-2-formyl-3$\beta$-hydroxy - 5 - oxocyclopent-1-eneheptanoic acid and (−)-2-formyl-3$\alpha$-hydroxy-5-oxocyclopent-1-eneheptanoic acid, respectively.

The 2-styryl-3$\alpha$-hydroxy and 2-styryl-3$\beta$-hydroxy derivatives may be acylated in the same manner as the racemic mixtures thus producing the optically active 2-styryl-3$\alpha$-(lower alkanoyl)oxy and 2-styryl-3$\beta$-(lower alkanoyl)oxy and 2-styryl-3$\beta$-(lower alkanoyl)oxy compounds or the chloro(lower alkanoyl)oxy compounds. Again, hydroxylation and cleavage of the latter 2-styryl derivatives affords the optically active 2-formyl derivatives.

Reduction of the $\Delta^{1,2}$-2-formyl compounds of this invention readily provides the corresponding 2-formylcyclopentaneheptanoic acid and esters. Typical reducing agents are chromous sulfate or zinc metal, with chromous sulfate being particularly preferred. As an example of the reduction process, treatment of 2 - formyl-3-hydroxy-5-oxocyclopent-1-eneheptanoic acid with zinc powder in aqueous acetic acid yields 2-formyl-3-hydroxy-5-oxocyclopentaneheptanoic acid.

The compounds of this invention exhibit valuable pharmacological properties. They are anti-microbial agents as is evidenced by their anti-protozoal activity, e.g. against *Tetrahymena pyriformis*.

Evidence for the anti-protozoal activity of the compounds of this invention is provided by the following assay, wherein 2-formyl-3-hydroxy-5-oxocyclopent-1-eneheptanoic acid, for example, has been found active:

A solution is prepared from 24 g. of proteose peptone, 16 g. of sucrose and 1000 ml. of distilled water. 0.5 ml. of this solution is inoculated with 10% by volume of a 4–7 day old culture of *Tetrahymena pyriformis* and the resulting mixture is added to 0.5 ml. of a solution or suspension containing 2 mg. of test compound per ml. of solution. The resulting mixture is incubated at room temperature for 48 hours, then examined microscopically for the presence of motile protozoa. If any are observed, the compound is considered inactive. If no motile protozoa are observed, 0.1 ml. of the incubated mixture is serially diluted and mixed with additional quantities of the inoculated medium sufficient to produce concentrations of 1000, 100, 10 and 1 mcg. of the test compound per ml. and the resulting mixtures are incubated as before at room temperature for 48 hours, then are examined microscopically for the presence of motile protozoa. Controls are provided by concurrent incubations identical with the foregoing except for the absence of the test compound.

The instant compounds are useful also as intermediates in the manufacture of novel prostanoic acid derivatives and their optically active isomers of the following structural formula

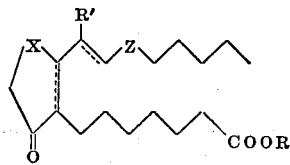

wherein R is hydrogen or a lower alkyl radical, as defined hereinbefore, R' is hydrogen or a hydroxy group, X is a hydroxymethylene or lower (alkanoyl)oxy methylene radical, Z is a carbonyl or hydroxymethylene group and the dotted line indicates an optional 8,12 double bond and an optional 13,14 double bond. The lower alkanoyl radicals are as defined hereinbefore.

A specific example of the manufacture of one of the latter compounds is the reaction of methyl 3-acetoxy-2-formyl-5-oxocyclopent-1-eneheptanoate with hexanoyl-methylene triphenyl phosphorane to afford methyl 11-acetoxy-9,15-dioxoprosta-8(12),13-dienoate. These prostanoic acid derivatives display valuable pharmacological properties. They are thus hypotensive, smooth muscle-contracting, anti-bacterial, anti-protozoal, anti-fungal and pepsin-inhibitory agents.

The following examples describe in detail compounds illustrative of the present invention and methods which have been devised for their manufacture. The invention, however, is not to be construed as limited thereby either in spirit or in scope since it will be apparent to those skilled in the art that many modifications both of materials and of methods may be practiced without departing from the purpose and intent of this disclosure. It is understood that the procedures employing racemic mixtures in the following examples are applicable to the optical isomers as well. Throughout these examples temperatures are given in degrees centigrade and relative amounts of materials in parts by weight except as otherwise noted.

EXAMPLE 1

A solution containing 100 parts of 4-phenyl-3-buten-2-one, 106 parts of selenous acid, 160 parts of dioxane and 20 parts of water is heated to the reflux temperature. After the initial vigorous reaction has subsided, the mixture is heated at that temperature for an additional 30 minutes. The supernatant is then decanted from the metallic selenium and is concentrated under reduced pressure. Distillation of the residue under reduced pressure affords, as a yellow oil, styrylglyoxal, boiling at about 120° at 2.5 mm. pressure.

EXAMPLE 2

A solution of 38.2 parts of dimethyl 3-oxoundecane-1,11-dioate in 200 parts by volume of 10% aqueous potassium hydroxide is stored at 0–5° for about 3 days, then is adjusted to pH 5 by the addition of concentrated aqueous citric acid. To that mixture is added a solution which is prepared by heating 21.9 parts of styrylglyoxal in 50 parts by volume of 50% aqueous methanol at 65–75° for about 20 minutes, then adding 60 parts of methanol. To the resulting reaction mixture is added 30 parts by volume of 1 M pH 4.5–5.0 citrate buffer and stirring at room temperature is continued for about 3 hours, during which time carbon dioxide gas is evolved. The precipitated product is collected by filtration, thus affording the half potassium salt of 14-phenyl-9,12-dioxo-11-hydroxytetradec-13-enoic acid, melting at about 105°. Further purification by recrystallization from methanol affords the pure compound, melting at about 107.5°.

The latter half potassium salt is dissolved in water and the resulting aqueous solution is acidified by the addition of dilute hydrochloric acid. The resulting acidic mixture is extracted with ether and the ether layer is separated, washed with water, dried over anhydrous sodium sulfate and concentrated to dryness. The resulting solid residue is purified by recrystallization from chloroform-ether to yield 14 - phenyl-9,12-dioxo-11-hydroxytetradec-13-enoic acid, melting at about 81.5–83°.

EXAMPLE 3

To 3000 parts by volume of an aqueous solution containing 6.7 parts of potassium hydroxide is added, with stirring at 21–23° over a period of about 2¼ hours, a solution of 10.4 parts of 14-phenyl-9,12-dioxo-11-hydroxytetradec-13-enoic acid in 187 parts of chloroform. After completion of the addition, the reaction mixture is stirred for an additional 2 hours, then is made acidic by adding 10 parts of oxalic acid dihydrate. The acidic mixture is extracted with chloroform and the organic layer is washed with dilute aqueous sodium chloride, then dried over anhydrous sodium sulfate and concentrated to dryness under reduced pressure. The resulting residue is recrystallized first from benzene, then from chloroform-ether to yield 3 - hydroxy-5-oxo-2-styrylcyclopent-1-eneheptanoic acid, which displays a melting point at about 118°. This compound displays an ultraviolet absorption maximum at about 325 millimicrons with a molecular extinction coefficient of about 36,400.

EXAMPLE 4

A mixture containing 44.3 parts of 3-hydroxy-5-oxo-2-styrylcyclopent-1-eneheptanoic acid, 11.3 parts of diazomethane and 700 parts of ether is kept at room temperature for about 5 minutes, at the end of which time acetic acid is added in order to destroy the excess reagent. The resulting mixture is then washed with aqueous sodium bicarbonate, dried over anhydrous sodium sulfate and stripped of solvent by distillation under reduced pressure. The residue is purified by chromatography, first on silica gel followed by elution with 50% ethyl acetate in benzene, then by dry chromatography on silica gel containing 8% water, also using 50% ethyl acetate in benzene, thus affording methyl 3-hydroxy-5-oxo-2-styrylcyclopent-1-eneheptanoate. This compound is characterized by infrared absorption maxima, in chloroform, at about 2.75, 2.87, 5.76, 5.88 and 6.17 microns and by an ultraviolet absorption maximum at about 325 millimicrons with a molecular extinction coefficient of about 36,000.

EXAMPLE 5

A solution containing 0.9 part of methyl 3-hydroxy-5-oxo-2-styrylcyclopent-1-eneheptanoate, 10 parts of pyridine and 2 parts of acetic anhydride is kept at room temperature for about 16 hours, then is poured slowly into water. The resulting aqueous mixture is extracted with ether and the ether layer is separated, washed successively with dilute aqueous sodium bicarbonate and dilute aqueous sodium chloride, then dried over anhydrous sodium sulfate and concentrated to dryness under reduced pressure. The resulting residue is purified either by preparative thin layer chromatography using 20% ethyl acetate in benzene on silica gel or by dry chromatography on silica gel containing 8% water, also using 20% ethyl acetate in benzene. The resulting product, obtained as an oil, is methyl 3 - acetoxy-5-oxo-2-styrylcyclopent-1-eneheptanoate. In chloroform, this compound exhibits infrared absorption maxima at about 5.75, 5.86, 6.15 and 8.02 microns. It exhibits also an ultraviolet absorption maximum at about 325 millimicrons with a molecular extinction coefficient of about 32,700.

EXAMPLE 6

To a solution of 1.23 parts of methyl 3-acetoxy-5-oxo-2-styrylcyclopent-1-eneheptanoate in 20 parts of dioxane is added a solution of 0.81 part of osmium tetroxide in 3.85 parts of dioxane. The resulting reaction mixture is allowed to stand at room temperature for about 70 hours, at the end of which time the excess reagent is decomposed by the addition of hydrogen sulfide. The resulting solution is filtered through silica gel containing 8% of water and the adsorbent is washed with an ethyl acetate-methanol solution. The filtrate is concentrated and purified by dry column chromatography on silica gel containing 8% of water, using 50% ethyl acetate in benzene, thus affording, as an oil, methyl 3-acetoxy-5-oxo-2-($\alpha,\beta$-dihydroxyphenethyl)cyclopent-1-eneheptanoate. This compound exhibits infrared absorption maxima, in chloroform, at about 2.78 and 5.78 microns and also an ultraviolet absorption maximum at about 234 millimicrons with a molecular extinction coefficient of about 10,900.

EXAMPLE 7

To a solution of 0.2 part of methyl 3-acetoxy-5-oxo-2-($\alpha,\beta$-dihydroxyphenethyl)cyclopent-1-eneheptanoate in 8 parts of ethanol is added a solution of 0.12 part of sodium periodate in 2 parts of water. The resulting reaction mixture is allowed to stand at room temperature for about 45 minutes, then is diluted with water and extracted with ether. The ether layer is separated, washed with water, dried over anhydrous sodium sulfate and concentrated to dryness under reduced pressure. The resulting residue is heated under reduced pressure for about 10 minutes in order to remove benzaldehyde, thus affording the oily product, which is methyl 3-acetoxy-2-formyl-5-oxocyclopent-1-eneheptanoate. It displays infrared absorption maxima, in chloroform, at about 5.78 and 5.92 microns and is represented by the following structural formula

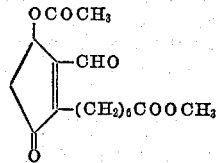

EXAMPLE 8

To a suspension of 214 parts of triphenyl methyl phosphonium bromide with 1400 parts of ether, under nitrogen, is added, at 0–5°, 190 parts by volume of a hexane solution containing 41.9 parts of n-butyl lithium. The resulting reaction mixture is allowed to warm to room temperature, then is stirred for about 1 hour and cooled to 0–5°. A solution of 100 parts of n-hexanoyl chloride in 700 parts of ether is added under nitrogen and the resulting mixture is kept at room temperature for about 16 hours. At the end of that reaction period the ether solution is decanted and washed with dilute hydrobromic acid. The acidic washing is then shaken with the precipitate and the resulting solution is extracted with chloroform. The chloroform extract is washed successively with hydrobromic acid and water, dried over anhydrous sodium sulfate, concentrated to a small volume and diluted with hexane. The resulting crystals of starting material are removed by filtration and the filtrate is dissolved in chloroform, then washed successively with 20% aqueous potassium hydroxide, water, hydrobromic acid and water, dried over anhydrous sodium sulfate and concentrated to a small volume under reduced pressure. Dilution of the resulting solution with cyclohexane results in precipitation of the crystalline product, which is purified by recrystallization from aqueous ethanol to afford transparent needle-like crystals of triphenyl 2-oxoheptyl phosphonium bromide, melting at about 195°.

EXAMPLE 9

A solution of 0.19 part of triphenyl 2-oxoheptyl phosphonium bromide in 75 parts of chloroform is shaken with dilute aqueous potassium hydroxide, then washed with dilute aqueous sodium chloride, dried over anhydrous sodium sulfate, concentrated and dried at room temperature under reduced pressure. The resulting residue consisting of 0.16 part of hexanoylmethylene triphenyl phosphorane is combined with 0.13 part of methyl 3-acetoxy-2-formyl-5 - oxocyclopent-1-eneheptanoate and dissolved in 13.2 parts of benzene. The resulting reaction mixture is heated at the reflux temperature for about 24 hours, then is cooled and stripped of solvent under reduced pressure. The resulting residue is purified by dry column chromatography on silica gel containing 8% of water, using 20% ethyl acetate in benzene, to afford methyl 11-acetoxy-9,15-dioxoprosta-8(12), 13-dienoate. This compound exhibits infrared absorption maxima, in chloroform, at about 5.78 and 6.28 microns and an ultraviolet absorption maximum at about 288.5 millimicrons with a molecular extinction coefficient of about 31,300.

EXAMPLE 10

A mixture consisting of 13 parts of 3-hydroxy-5-oxo-2-styrylcyclopent-1-eneheptanoic acid, 17.8 parts of sodium periodate, 55 parts of water, 160 parts of dioxane and 2 parts of a 2% osmium tetroxide in dioxane solution is stirred under nitrogen at room temperature for about 4 hours. That reaction mixture is then extracted with ether and the ether layer is separated and extracted several times with 0.5% aqueous sodium chloride. The salt extracts are saturated with sodium chloride, then extracted with ether. The ether layer is separated, dried over anhydrous sodium sulfate, concentrated and dried under reduced pressure to afford 2-formyl-3-hydroxy-5-oxocyclopent-1-eneheptanoic acid, characterized by an ultraviolet absorption maximum at about 228 millimicrons with a molecular extinction coefficient of about 10,100 and by the following structural formula

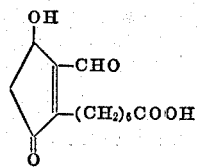

EXAMPLE 11

To a solution of 10.2 parts of 2-formyl-3-hydroxy-5-oxocyclopent-1-eneheptanoic acid in 200 parts of dioxane is added 4 parts of triethylamine and the resulting mixture is stripped of excess triethylamine by distillation under reduced pressure. The resulting residue is dissolved in 210 parts of dioxane. To that dioxane solution is then added 15.3 parts of hexanoylmethylene triphenyl phosphorane, dissolved in 396 parts of benzene. The resulting reaction mixture is heated at the reflux temperature under nitrogen for about 18 hours, then is cooled, washed with aqueous oxalic acid and extracted with aqueous potassium bicarbonate. That alkaline extract is washed with ether, then acidified with oxalic acid and extracted with ether. The ether extract is washed with aqueous sodium chloride, dried over anhydrous sodium sulfate and concentrated to dryness and reduced pressure to afford the crude product, which is purified by dry column chromatography on silica gel containing 8% of water, using 4% methanol in benzene or by chromatography on silica gel and elution with 40% ethyl acetate in benzene, thus affording 11-hydroxy-9,15-dioxoprosta-8(12),13-dienoic acid, characterized by an ultraviolet absorption maximum at about 291 millimicrons with a molecular extinction coefficient of about 21,900.

EXAMPLE 12

To a solution of 0.25 part of lithium metal in 70 parts of liquid ammonia is added a solution of 1 part of 11-hydroxy-9,15-dioxoprosta-8(12),13-dienoic acid in 18 parts of tetrahydrofuran. The reaction mixture is stirred for about 10 minutes, at the end of which time 5 parts of solid ammonium chloride is added rapidly. The ammonia is evaporated under a stream of nitrogen and the resulting residue is cooled to 0–5°, then diluted with ether. To the resulting suspension is added excess cold aqueous citric acid until the mixture is distinctly acidic. The resulting layers are separated and the aqueous layer is extracted with ether. The combined ether solutions are washed several times with aqueous sodium chloride, then dried over anhydrous sodium sulfate and concentrated to dryness under nitrogen to afford an orange oily residue. That oil is dissolved in a 25% ethyl acetate in benzene solution and purified by dry column chromatography on silica gel containing 8% of water and 2% of glacial acetic acid, using ethyl acetate as the solvent, to afford a fraction which is 11-hydroxy-9,15-dioxoprost-8(12)-enoic acid, characterized by an ultraviolet absorption maximum at about 233 millimicrons with a molecular extinction coefficient of about 13,900.

EXAMPLE 13

To a solution of 12 parts of 11-hydroxy-9,15-dioxoprosta-8(12),13-dienoic acid in 28 parts of ethanol, cooled to 0–5°, is added dropwise a solution of 3 parts of triethylamine in 275 parts of water. To that mixture is added dropwise with cooling and stirring a solution of 0.32 part of sodium borohydride in 32 parts of water. Stirring at approximately 10° is continued for about 25 minutes, at the end of which time the reaction mixture is poured carefully into excess aqueous citric acid. Extraction with ether affords an organic solution, which is washed with water, dried over anhydrous sodium sulfate and concentrated under reduced pressure to afford 11,15-dihydroxy-9-oxoprosta-8(12),13-dienoic acid. This mixture of epimeric 11-hydroxy compounds is separated by chromatography on silica gel. Elution with 30% ethyl acetate in chloroform affords epimer A, characterized by an ultraviolet absorption maximum at about 277 millimicrons with a molecular extinction coefficient of about 24,400. Further elution of the column with 50% ethyl acetate in chloroform yields epimer B, characterized by an ultraviolet absorption maximum at about 277.5 millimicrons with a molecular extinction coefficient of about 23,400.

EXAMPLE 14

A mixture of 13.5 parts of methyl 3-hydroxy-5-oxo-2-styrylcyclopent-1-eneheptanoate, 17.8 parts of sodium periodate, 55 parts of water, 160 parts of dioxane and 2 parts by volume of a 2% osmium tetroxide in dioxane solution is stirred at room temperature under nitrogen for about 4 hours. The reaction mixture is extracted with ether and the ether solution is dried over anhydrous sodium sulfate, then concentrated to dryness under reduced pressure. The resulting residue is purified by dry column chromatography on silica gel containing 8% of water, using 50% ethyl acetate in benzene, thus affording methyl 2-formyl-3-hydroxy-5-oxocyclopent-1-eneheptanoate, characterized by an ultraviolet absorption maximum at about 228 millimicrons with a molecular extinction coefficient of about 10,200. This compound is represented by the following structural formula

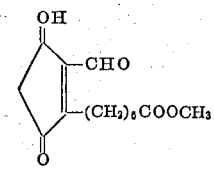

EXAMPLE 15

To a solution of 3.4 parts of methyl 3-hydroxy-5-oxo-2-styrylcyclopent-1-eneheptanoate in 40 parts of dioxane is added successively 1.3 parts by volume of a 2% osmium tetroxide in dioxane solution and a solution of 4.28 parts of sodium periodate in 14 parts of water. The resulting reaction mixture is stirred at room temperature for about 3 hours, then is extracted with ether and the ether extract is poured through a column of anhydrous sodium sulfate, then concentrated to dryness under reduced pressure. The latter residue together with hexanoylmethylene triphenyl phosphorane, prepared from 4.1 parts of triphenyl methyl phosphonium chloride by the procedure described in Example 9, is dissolved in 200 parts of benzene and that reaction mixture is heated at the reflux temperature under nitrogen for about 20 hours. The solvent is removed by distillation under reduced pressure and the residual material is purified by dry column chromatography on silica gel containing 8% of water, using 50% ethyl acetate in benzene, thus affording methyl 11-hydroxy-9,15-dioxoprosta-8(12),13-dienoate, which compound exhibits an ultraviolet absorption maximum at about 291.5 millimicrons with a molecular extinction coefficient of about 24,600.

EXAMPLE 16

To a solution of 6.8 parts of methyl 3-hydroxy-5-oxo-2-styrylcyclopent-1-eneheptanoate and 2 parts of pyridine in 80 parts of dioxane is added, at 0–5°, a solution of 2.4 parts of chloroacetyl chloride in 20 parts of dioxane. The resulting reaction mixture is stirred at that temperature for about 30 minutes, then at room temperature for about 5 hours. At the end of that reaction period the mixture is poured carefully into ice water and the resulting aqueous mixture is extracted with ether. The ether solution is washed successively with dilute hydrochloric acid and dilute aqueous sodium bicarbonate, then dried over anhydrous sodium sulfate and stripped of solvent under reduced pressure. The resulting product is purified by dry column chromatography on silica gel containing 8% of water, using 18% ethyl acetate in benzene, to afford pure methyl 3-chloroacetoxy-5-oxo-2-styrylcyclopent-1-eneheptanoate.

EXAMPLE 17

To a suspension of 1.3 parts of chromium trioxide with 15 parts of pyridine is added a solution of 1.5 parts of methyl 3-hydroxy-5-oxo-2-styrylcyclopent-1-eneheptanoate in 8 parts of pyridine and the resulting reaction mixture is stirred at room temperature for about 1 hour.

then is allowed to stand at that temperature for about 16 hours. To the reaction mixture ice water is then added carefully and the resulting aqueous mixture is extracted with methylene chloride. The organic extract is washed successively with dilute hydrochloric acid and dilute aqueous sodium chloride, then dried over anhydrous sodium sulfate and stripped of solvent under reduced pressure. The resulting residue is purified by dry column chromatography on silica gel containing 8% of water followed by extraction of the column with 18% ethyl acetate in benzene. The resulting crystalline product is purified further by recrystallization from benzene-cyclohexane to afford methyl 3,5-dioxo-2-styrylcyclopent-1-eneheptanoate, obtained as yellow needle-like crystals melting at about 62.5°. This compound displays ultraviolet absorption maxima at about 340.5 and 250.5 millimicrons with molecular extinction coefficients of 24,000 and 10,500, respectively.

EXAMPLE 18

A mixture containing 1.7 parts of methyl 3,5-dioxo-2-styrylcyclopent-1-eneheptanoate, 1.44 parts of osmium tetroxide and 30 parts of dioxane is allowed to stand at room temperature for about 6 days. The reaction mixture which has solidified during that period is diluted with dioxane and hydrogen sulfide gas is bubbled into the resulting suspension. The inorganic insolubles are removed by filtration and the filtrate is concentrated to dryness under reduced pressure. Purification of the resulting residue by dry column chromatography, using a silica gel column containing 8% of water and 50% ethyl acetate in benzene as the solvent, affords methyl 3,5-dioxo-2-($\alpha,\beta$ - dihydroxyphenethyl)cyclopent - 1 - eneheptanoate, which displays an ultraviolet absorption maximum at about 247.5 millimicrons with a molecular extinction coefficient of about 10,750.

EXAMPLE 19

To a cold solution of 0.8 part of potassium hydroxide in 10 parts of water is added 2 parts of ethyl 3-oxooctanoate and that mixture is stirred at 0–5° until homogeneous. The homogeneous mixture is kept at 0–5° for about 72 hours, then is neutralized to pH 7 by the addition of concentrated aqueous citric acid. To that mixture is then added successively 2.5 parts by volume of 1 M citrate buffer of pH 4.8 and a solution of 2.5 parts of 2-formyl-2-hydroxy-5-oxocyclopent-1-eneheptanoic acid in 4.8 parts of methanol containing 2.5 parts of water. The pH is adjusted to 4.5–5.0 and the mixture is stirred for approximately 3 hours at about 35°, then is allowed to stand at room temperature for about 16 hours. The reaction mixture is extracted with ether and the ether layer is separated, dried over anhydrous sodium sulfate and stripped of solvent under reduced pressure to afford, as a pale yellow glass, 11,13-dihydroxy-9,15-dioxoprost-8(12)-enoic acid, which compound displays an ultraviolet absorption maximum at about 233 millimicrons with a molecular extinction coefficient of about 11,500.

EXAMPLE 20

A solution of 8.27 parts of 2-formyl-3-hydroxy-5-oxocyclopent-1-eneheptanoic acid in 150 parts by volume of 50% aqueous acetic acid is stirred at 0–5° with 15 parts of zinc powder for about 2 hours. At the end of that time the mixture is filtered and the filtrate is diluted with approximately 200 parts by volume of saturated aqueous sodium chloride. Extraction of that mixture with ether affords an organic solution, which is washed with saturated aqueous sodium chloride, then dried over anhydrous sodium sulfate and stripped of solvent under reduced pressure. The resulting residue is combined with n-hexanoylmethylene triphenyl phosphorane, prepared from 27.2 parts of n-hexanoylmethyl triphenyl phosphonium chloride according to the procedure of Example 9, then is dissolved in a mixture of 100 parts of dioxane and 440 parts of benzene. The resulting mixture is heated under nitrogen at the reflux temperature for about 5½ hours, then is concentrated to dryness under reduced pressure. The resulting residue is extracted with ether and the ether extract is washed with cold hydrochloric acid, then with cold water and is finally extracted with cold aqueous potassium bicarbonate. The alkaline extract is acidified by the addition of citric acid and that acidic mixture is extracted with ether. The ether solution is washed with water, dried over anhydrous sodium sulfate and concentrated to dryness under reduced pressure to afford a mixture of 11$\alpha$-hydroxy-9,15-dioxoprost-13-enoic acid and 11$\beta$-hydroxy-9,15-dioxoprost-13-enoic acid. Separation of those epimers is achieved by partition chromatography on silica gel, wherein the solvents are prepared by shaking together 500 parts of volume of hexane, 1000 parts by volume of benzene, 500 parts by volume of methanol and 200 parts of water. The lower layer is used as the stationary phase and the upper layer as the eluant. Elution of the column affords 11$\beta$-hydroxy-9,15-dioxoprost-13-enoic acid, characterized by an ultraviolet absorption maximum at about 228.5 millimicrons with a molecular extinction coefficient of about 11,400, followed by 11$\alpha$-hydroxy-9,15-dioxoprost-13-enoic acid, which exhibits an ultraviolet absorption maximum at about 228.5 millimicrons with a molecular extinction coefficient of about 10,700.

EXAMPLE 21

By substituting an equivalent quantity of methyl 3-chloroacetoxy-5-oxo-2-styrylcyclopent-1-eneheptanoate in the procedure of Example 10, there is obtained methyl 3-chloroacetoxy-2-formyl-5-oxocyclopent-1-eneheptanoate.

EXAMPLE 22

Substitution of an equivalent quantity of methyl 3,5-dioxo-2-styrylcyclopent-1-eneheptanoate in the procedure of Example 10 affords methyl 2-formyl-3,5-dioxocyclopent-1-eneheptanote.

EXAMPLE 23

When an equivalent quantity of propionic anhydride is substituted in the procedure of Example 5, there is produced methyl 3-propionoxy-5-oxo-2-styrylcyclopent-1-eneheptanoate.

EXAMPLE 24

By substituting an equivalent quality of methyl 3-propionoxy-5-oxo-2-styrylcyclopent-1 - eneheptanoate in the procedure of Example 10 and otherwise following the procedure of Example 10, methyl 2-formyl-3-propionoxy-5-oxocyclopent-1-eneheptanoate is produced.

EXAMPLE 25

Substitution of an equivalent quantity of diazoethane in the procedure of Example 4 yields ethyl 3-hydroxy-5-oxo-2-styrylcyclopent-1-eneheptanoate.

EXAMPLE 26

By substituting an equivalent quantity of ethyl 3-hydroxy-5-oxo-2-styrylcyclopent - 1 - eneheptanoate in the procedure of Example 10, there is afforded ethyl 2-formyl-3-hydroxy-5-oxocyclopent-1-eneheptanoate.

EXAMPLE 27

A mixture of 3.3 parts of (−)-O-methylamandelic acid, 44 parts of benzene, and 9.67 parts of oxalyl chloride is heated at 60–70° for about 90 minutes. After the solvent is removed under reduced pressure, the remaining residue is dissolved in 26.4 parts of benzene and again concentrated to dryness. The crude (−)-O-methylmandelyl chloride thus obtained is taken up in 17.6 parts of benzene and added to a cold solution of 5.5 parts of 3-hydroxy-5-oxo-2-styrylcyclopent - 1 - eneheptanoic acid dissolved in 9.82 parts of dry pyridine. That mixture is allowed to stand for about 16 hours at room temperature and then it is poured into a cold solution containing 40 parts of d-tartaric acid in 1350 parts of water. That mixture is extracted with ethyl acetate and the organic extracts are washed with water, dried over anhydrous sodium sulfate and concentrated to dryness. The oily residue which remains is dissolved in benzene and chromatographed on silicic acid. The initial fraction obtained upon elution with 15% ethyl-acetate-85% benzene is recrystallized from benzene-hexane to give colorless crystals of 3β-((−)-O-methylmandeloxy)-5-oxo-2-styrylcyclopent-1-eneheptanoic acid, melting at about 122–124° and displaying an optical rotation in methanol of about −22.2°. That compound is further characterized, in chloroform, by absorption maxima in the infrared spectrum at about 1750, 1710 and 1630 reciprocal centimeters and an ultraviolet absorption band, in methanol, at about 326 millimicrons with a molecular extinction coefficient of about 36,000. The latter fraction, obtained upon elution with 15% ethyl acetate-85% benzene, is recrystallized from benzene-hexane to give colorless needles of 3α-((−)-O-methylmandeloxy)-5-oxo-2-styrylcyclopent-1-eneheptanoic acid, melting at about 96–98° and displaying an optical rotation of about −84.2° in methanol. That compound absorbs in the infrared spectrum, in chloroform, at about 1750, 1710 and 1630 reciprocal centimeters and has an absorption band in the ultraviolet spectrum at about 326 millimicrons with a molecular extinction coefficient of about 35,000 in methanol.

EXAMPLE 28

A solution of 0.300 part of 3β-((−)-O-methylmandeloxy)-5-oxo-2-styrylcyclopent-1-eneheptanoic acid in 2.66 parts of tetrahydrofuran is added to 30 parts by volume of a 1% aqueous potassium carbonate solution. That mixture then is allowed to stand at room temperature under a nitrogen atmosphere in subdued light for about 3 days. The resulting solution is cooled in ice and acidified with dilute aqueous acetic acid. Then the product is isolated by filtration, taken up in ethyl acetate, washed with water, dried over anhydrous sodium sulfate, and dried under reduced pressure. The crude residue is dissolved in a small amount of 50% benzene-ethyl acetate and chromatographed on silicic acid suspended in 50% benzene-ethyl acetate. Elution with the same solvent yields the crude product which is recrystallized from benzene containing a small amount of ethyl acetate to give pure colorless crystals of (+)-3β-hydroxy-5-oxo-2-styrylcyclopent-1-eneheptanoic acid, melting at about 112–114° and displaying an optical rotation in methanol of about +12.6°. That compound further displays, in methanol, an absorption band in the ultraviolet spectrum at about 326 millimicrons with a molecular extinction coefficient of about 35,600.

EXAMPLE 29

By substituting an equivalent quantity of 3α-((−)-O-methylmandeloxy) - 5 - oxo - 2 - styrylcyclopent - 1-eneheptanoic acid in the procedure of Example 28, there is obtained (−)-3α-hydroxy-5-oxo-2-styrylcyclopent-1-eneheptanoic acid, melting at about 112–113° and displaying an optical rotation in methanol of about −16.5°.

EXAMPLE 30

When an equivalent quantity of (±)-3β-hydroxy-5-oxo-2-styrylcyclopent-1-eneheptanoic acid is substituted in the procedure of Example 10, there is produced (+)-2-formyl-3β-hydroxy-5-oxocyclopent-1-eneheptanoic acid. That compound is structurally represented by the following formula

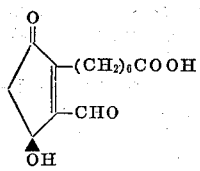

EXAMPLE 31

Substitution of an equivalent quantity of (−)-3α-hydroxy-5-oxo-2-styrylcyclopent-1-eneheptanoic acid in the procedure of Example 10 and otherwise following the procedure of Example 10 yields (−)-2-formyl-3α-hydroxy-5-oxocyclopent-1-eneheptanoic acid. That compound is represented by the following structural formula

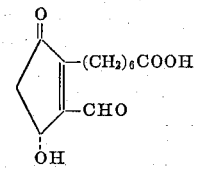

EXAMPLE 32

Method A

A solution of 8.27 parts of 2-formyl-3-hydroxy-5-oxocyclopent-1-eneheptanoic acid in 150 parts by volume of 50% aqueous acetic acid is stirred at 0–5° with 15 parts of zinc powder for about 2 hours. At the end of that time the mixture is filtered and the filtrate is diluted with approximately 200 parts by volume of saturated aqueous sodium chloride. Extraction of that mixture with ether affords an organic solution which is washed with saturated aqueous sodium chloride, then dried over anhydrous sodium sulfate and stripped of solvent under reduced pressure to yield 2-formyl-3-hydroxy-5-oxocyclopentaneheptanoic acid.

Method B

To a solution of 2 parts of 2-formyl-3-hydroxy-5-oxocyclopent-1-eneheptanoic acid and 1 part by volume of dihydropyran in 6.7 parts of methylene chloride is added a solution containing 0.02 part of p-toluenesulfonic acid in 0.18 part of tetrahydrofuran. A rapid exothermic reaction then ensues. After completion of the reaction, the mixture is diluted with 400 parts of methylene chloride, then washed with aqueous sodium sulfate and dried over anhydrous sodium sulfate. Concentration of the dried mixture under reduced pressure affords, as a pale yellow oil, 2-formyl-3-tetrahydropyran - 1 - yloxy-5-oxocyclopent-1-eneheptanoic acid.

To the crude reaction mixture containing 2-formyl-3-tetrahydropyran-1-yloxy - 5 - oxocyclopent-1-eneheptanoic acid described in the previous paragraph is added 32 parts by volume of chromous sulfate solution, prepared from chromic sulfate as described in Organic Synthesis, volume 49, page 98. The resulting reaction mixture is stirred under nitrogen for about 30 minutes, at the end of which time 3 parts of ammonium sulfate and 25 parts of sucrose are added and the mixture is finally acidified by the addition of 1 M aqueous citric acid. That mixture is extracted with ether and the ether extract is separated, washed successively with saturated ammonium chloride and saturated sodium chloride, then dried over anhydrous sodium sulfate and concentrated under reduced pressure to yield, as the major product, 2β-formyl-3α-tetrahydropyran-1-yloxy-5-oxocyclopentane-1α-heptanoic acid. The corresponding 3β-tetrahydropyran-1-yl ether is obtained as the minor product.

A solution containing 2β-formyl-3α-tetrahydropyran-1-yloxy-5-oxocyclopentane-1α-heptanoic acid in an acetic acid:water:tetrahydrofuran (20:10:3) mixture is stored at 38–40° for about 3 hours, then is concentrated to dryness under reduced pressure, to afford 2β-formyl-3α-hydroxy-5-oxocyclopentane-1α-heptanoic acid.

EXAMPLE 33

When an equivalent quantity of (+)-O-methylmandelic acid is substituted in the procedure of Example 27, there are produced 3β-((+)-O-methylmandeloxy)-5-oxo-2-styrylcyclopent-1-eneheptanoic acid, displaying an optical rotation in methanol of +84°, and 3α-((+)-O-methylmandeloxy) - 5-oxo-2-styrylcyclopent - 1 - eneheptanoic acid, displaying an optical rotation in methanol of +20°.

These compounds are respectively characterized by the following structural formulas

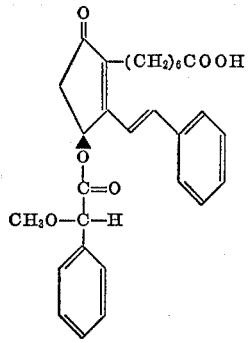

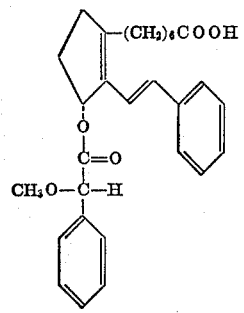

EXAMPLE 34

A solution containing 2.2 parts of 2β-formyl-3α-tetrahydropyran-1-yloxy-5-oxocyclopentane-1α-heptanoic acid and 5 parts of triphenyl n-hexanoylmethylene phosphorane in 101 parts of benzene is heated at the reflux temperature for about 4 hours, then is cooled, washed successively with aqueous citric acid and aqueous sodium chloride, then dried over anhydrous sodium sulfate and chromatographed on a silicic acid column. Elution of the column with 15% ethyl acetate in benzene affords (±)-9-oxo-11α-tetrahydropyran-1-yloxy-15-oxoprost-13-*trans*-enoic acid. Obtained as a minor product is the corresponding 11β-isomer, which is more polar on thin layer chromatogram using a silica gel plate with a benzene:ethyl acetate:acetic acid (50:50:2) mixture as the developing solvent.

The procedure of the preceding paragraph is repeated starting with 2.2 parts of 2β-formyl-3α-tetrahydropyran-1-yloxy - 5 - oxocyclopentane - 1α - heptanoic acid and the washed and dried benzene solution is used as such without chromatographic separation. That solution is warmed with 150 parts by volume of an acetic acid:water:tetrahydrofuran (20:10:3) mixture at about 38–40° for approximately 4 hours. Elution of that mixture with water affords an aqueous solution, which is extracted with benzene. The benzene extract is washed with aqueous sodium chloride, dried over anhydrous sodium sulfate and concentrated under reduced pressure, then purified by chromatography on silicic acid to yield (±)-9-oxo-11α-hydroxy-15-oxoprost-13-*trans*-enoic acid, represented by the following structural formula

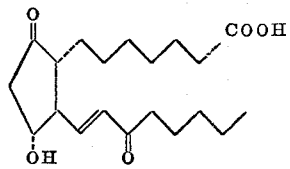

What is claimed is:
1. A compound of the formula

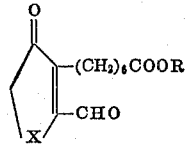

wherein X is a carbonyl radical or a radical of the formula

with Z being hydroxy, lower alkanoyloxy or chloro(lower alkanoyl)oxy and the wavy lines representing the α or β stereochemical configuration or the racemic mixture, and R is hydrogen or a lower alkyl radical.

2. As in claim 1, a compound of the formula

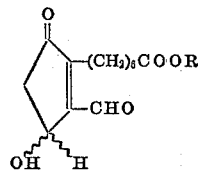

wherein the wavy lines represent the α or β stereochemical configurations or the racemic mixture and R is hydrogen or a lower alkyl radical.

3. As in claim 1, the compound which is 2-formyl-3-hydroxy-5-oxocyclopent-1-eneheptanoic acid.

4. As in claim 1, the compound which is methyl 2-formyl-3-hydroxy-5-oxocyclopent-1-eneheptanoate.

5. As in claim 1, the compound which is (+)-2-formyl-3β-hydroxy-5-oxocyclopent-1-eneheptanoic acid.

6. As in claim 1, the compound which is (−)-2-formyl-3α-hydroxy-5-oxocyclopent-1-eneheptanoic acid.

7. The compound which is 2-formyl-3-hydroxy-5-oxocyclopentaneheptanoic acid.

References Cited

UNITED STATES PATENTS

| | | | |
|---|---|---|---|
| 3,532,721 | 10/1960 | Finch | 260—345.8 |
| 3,736,335 | 5/1973 | Wendler et al. | 260—340.9 |

OTHER REFERENCES

Miyano et al.: Tetrahedron Letters 1615 (1969).
Katsube et al.: Agr. Biol. Chem. 35 1768 (1971).

LORRAINE A. WEINBERGER, Primary Examiner
R. GERSTL, Assistant Examiner

U.S. Cl. X.R.

210—418 D, 487, 488 R, 514 D, 514 K